United States Patent [19]
Phillips

[11] Patent Number: 5,881,196
[45] Date of Patent: Mar. 9, 1999

[54] WAVEGUIDE SECURITY DEVICE

[76] Inventor: Stephen Phillips, 120 El Dorado Rd., Walnut Creek, Calif. 94595

[21] Appl. No.: 736,256

[22] Filed: Oct. 24, 1996

[51] Int. Cl.[6] .................................................. G02B 6/22
[52] U.S. Cl. ........................................ 385/127; 385/901
[58] Field of Search ................................. 385/901, 127, 385/128, 14, 38, 146, 129, 130, 131, 132; 362/32

[56] References Cited

U.S. PATENT DOCUMENTS

| | | | |
|---|---|---|---|
| 3,953,932 | 5/1976 | Graves | 428/66.5 |
| 4,026,309 | 5/1977 | Howard | 377/7 |
| 4,484,797 | 11/1984 | Knop et al. | 359/568 |
| 4,526,466 | 7/1985 | Sandercock | 356/71 |
| 4,534,398 | 8/1985 | Crane | 162/103 |
| 4,682,794 | 7/1987 | Margolin | 283/82 |
| 4,710,614 | 12/1987 | Camus | 356/71 |
| 4,750,802 | 6/1988 | Bhagavatula | 350/96.15 |
| 4,930,866 | 6/1990 | Berning et al. | 356/71 |
| 5,334,421 | 8/1994 | McNutt | 427/513 |
| 5,361,885 | 11/1994 | Modler | 194/214 |
| 5,419,424 | 5/1995 | Harbaugh | 194/206 |
| 5,461,692 | 10/1995 | Nagel | 385/127 |

*Primary Examiner*—Hung N. Ngo
*Attorney, Agent, or Firm*—Majestic, Parsons, Siebert & Hsue P.C.

[57] ABSTRACT

A security device in the form of optically variable waveguides that produce color shifts at particular exit viewing angles. Wavelength filtering in the cladding layers using interference coatings and colorants produces waveguide modes of different colors. These optical devices can be incorporated within currency paper, gaming chips or credit cards to help determine their genuineness.

25 Claims, 3 Drawing Sheets

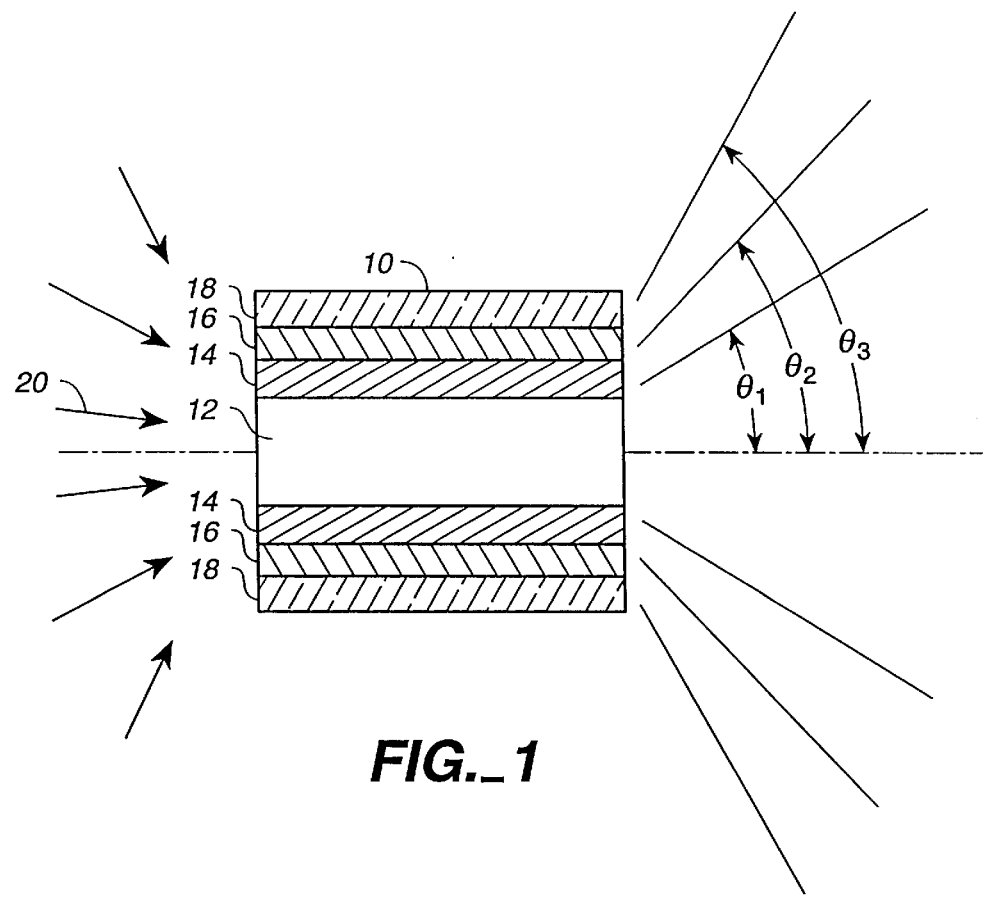
FIG._1
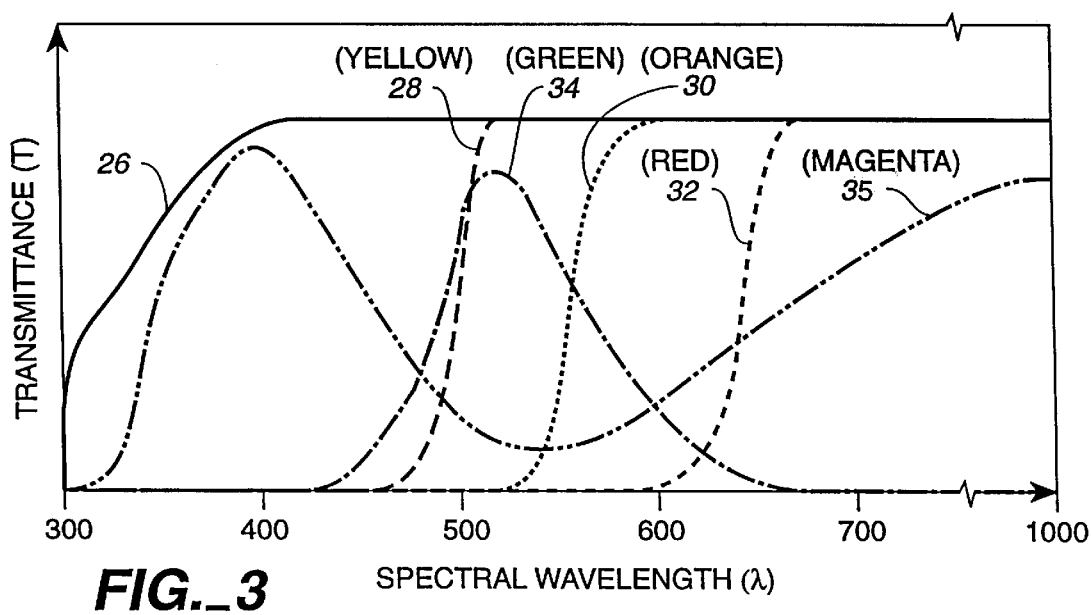
FIG._3

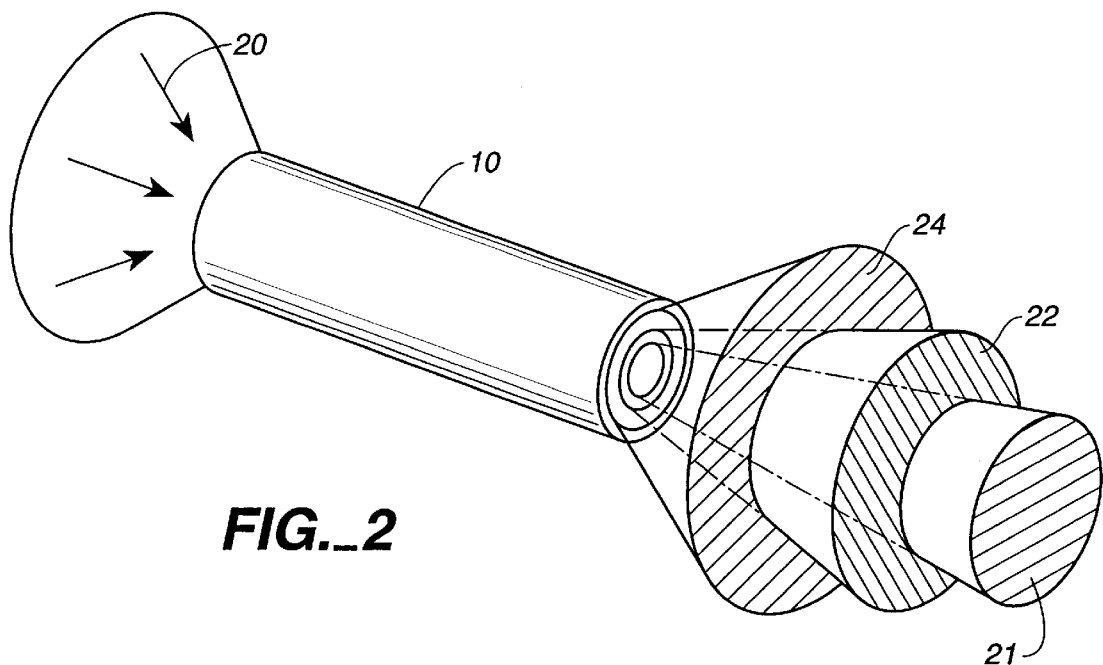
FIG._2
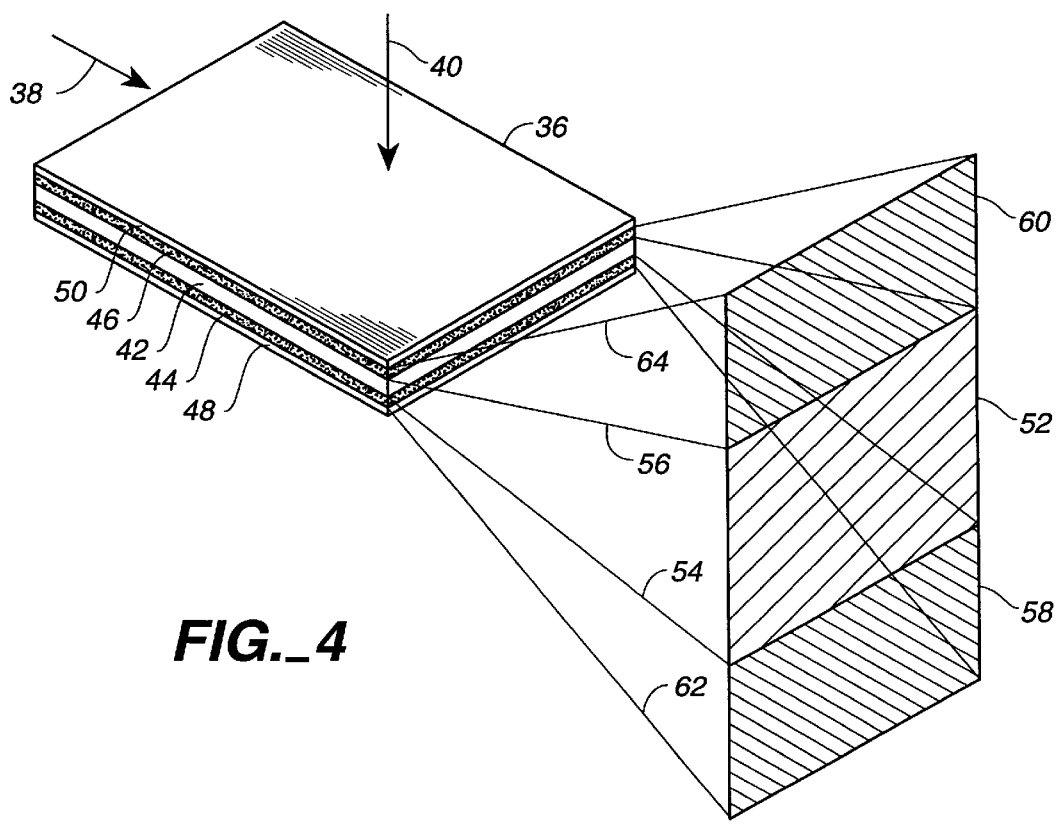
FIG._4

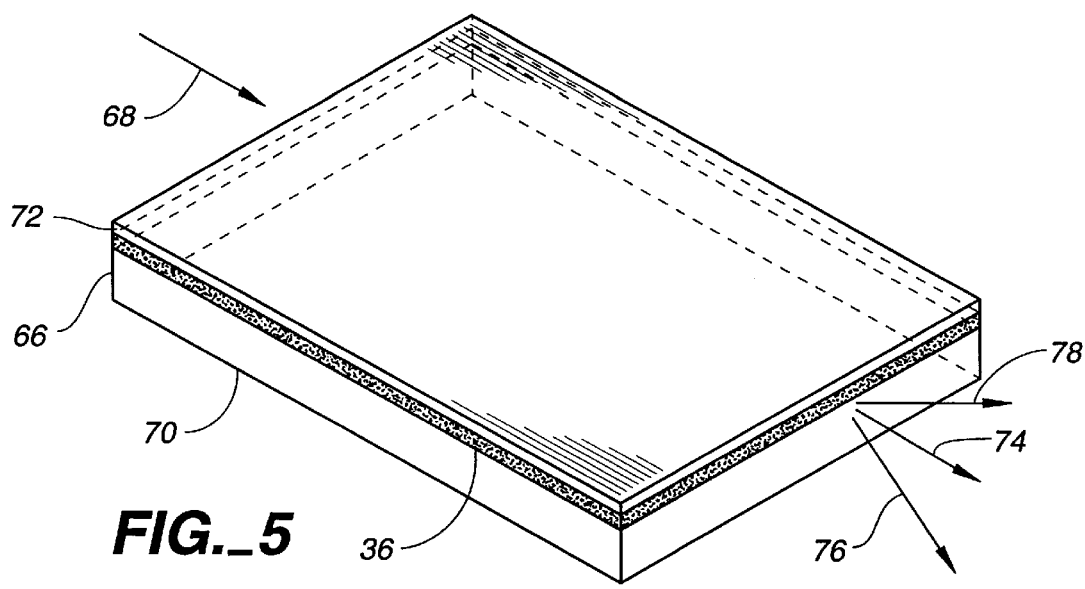
FIG._5
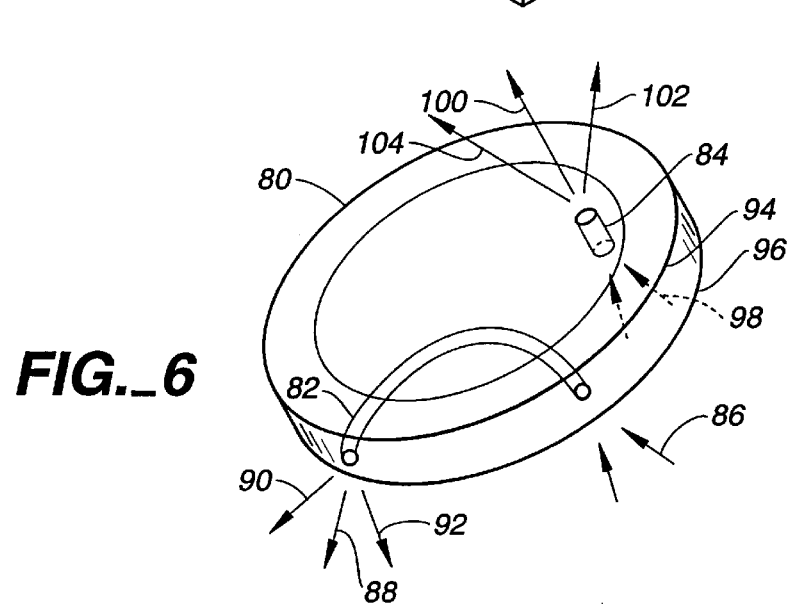
FIG._6
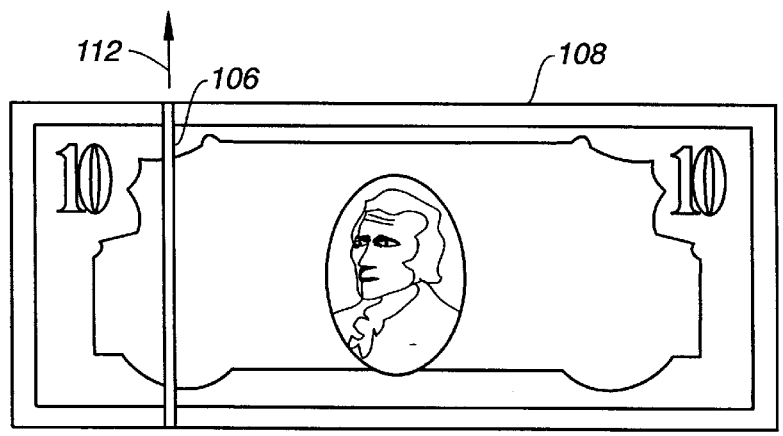
FIG._7

WAVEGUIDE SECURITY DEVICE

BACKGROUND OF THE INVENTION

1. Field of the Invention

The subject invention relates to a verification device for use in gaming chips typically used in casinos, for ID or credit cards and for security paper such as banknotes, for anticounterfeit security protection.

2. Description of the Prior Art

While the invention can be employed to facilitate the identification of any article not incorporating the waveguide device, the best use is the rapid identification of plastic gaming chips or casino chips that have molded into them the optical variable waveguide.

Casinos converts legal tender into gaming chips of various denominations. These chips typically contain identifying techniques such as base color, color coded edge spots, colored embossing and printed graphics in the center of the chip. Counterfeiting these chips is a problem because the chip can be painted different colors to match higher denominations and the graphics reproduced by color copy machines or personal computers and laminated to the chip.

Graves in U.S. Pat. No. 3,953,932 attempts to deter the unauthorized duplication of gaming chips by molding a transparent layer over the more opaque color insert, whereas Howard in U.S. Pat. No. 4,026,309 provides fluorescent strips along the periphery of the gaming chip to allow machine scanning of the chips denomination. Modlar in U.S. Pat. No. 5,361,885 provides an anticounterfeiting feature using a sandwiched light-conducting or translucent layer terminating around the peripheral edge of chip.

It is known in the art of banknote and currency papers to incorporate a security thread embedded within the paper making it difficult to illicitly reproduce. The present waveguide either in a round or planar strip configuration can be used as an embedded security thread in paper. Plastic security strip or thread is shown by Harbaugh in U.S. Pat. No. 5,419,424 for use in security or currency paper. Such threads contain reflective or transmitted micro-printing, electrically conductivity, and/or fluorescence. A diffraction grating authenticating device that operates as a diffractive subtractive color filter responsive to the angle of incidence of the polychromatic illuminating light is shown by Sandercock in U.S. Pat. No. 4,526,466 and by Knop et al. in U.S. Pat. No. 4,484,797. Other state-of-the-art authentication devices for currency paper is that developed by Berning et al. in U.S. Pat. No. 4,930,866 involves a thin film color shifter that are applied as a stamp or printed as an ink.

It is typical for credit, identification and data cards to contain optical anticounterfeit features such as holograms, colored micro-graphics, thin film color shifters and pictures to permit their authentication. A security means such as in Margolin in U.S. Pat. No. 4,682,794 comprising a plurality of optical fibers embedding into a credit card to form an unique code pattern. An security document comprising at least one embedded fiber optic using a core doped fluorescent fiber optic is disclosed by Camus in U.S. Pat. No. 4,710,614.

BRIEF DESCRIPTION OF THE INVENTION

It is an object of the invention to provide an improved verification device for use in gaming chips, security paper, and plastic credit cards.

The novel optical waveguide composite structure utilizing wavelength filtering in the different cladding layers results in a low cost counterfeit deterrent device that can be molded or laminated into said items to ascertain their genuineness.

It is a further object of the present invention to provide an anticounterfeiting device that has easy to see color shifts that occurs when viewed from different angles. The waveguide operates to using angularity-dependent subtractive-color filters. The waveguide or fiber optic structure of the device so efficiently conducts the light that no special light sources or equipment are require to view the colors changes other than normal ambient room light.

A further object of this invention is to provide a device that can be configured in different shapes and sizes. More particularly, this invention maybe embodied in planar as well as in circular optical waveguides. Both types of waveguides comprise a core that has relatively high refractive index and one or more color filtering cladding layers that have relatively lower refractive index(s) and that at least partially surrounds the core.

It is another object of this invention to incorporate in a gaming chip, security paper, and card construction a waveguide authenticating device that provides a plurality of distinct colors shifts that is very discernible by the human eye. Another object of the invention is to provide fluorescent and phosphorescent doping of the waveguide core and or cladding layers separately and in combination with core and cladding subtractive light filtering.

BRIEF DESCRIPTION OF THE DRAWINGS

FIG. 1 is cross section view of the security waveguide device indicating the colored cladding layers.

FIG. 2 is a perspective view illustrating one embodiment of the security waveguide device.

FIG. 3 is example of wavelength subtraction filters characteristics used in the device.

FIG. 4 is a perspective view illustrating another embodiment of the optical device in a planer or sheet configuration.

FIG. 5 is a perspective view illustrating the optical device in a plastic credit card.

FIG. 6 is a perspective view illustrating another embodiment of the optical device in a gaming chip.

FIG. 7 is a perspective view illustrating another embodiment the optical device in currency paper.

DETAILED DESCRIPTION OF THE INVENTION

Referring to the figures in detail, a preferred embodiment of a waveguide security verification device is shown in FIG. 1 by the reference numeral 10. A wide angle polychromatic illuminating light 20 is conducted into one end the waveguide device 10.

A high index fiber optic core 12 is surrounded by progressively decreasing indices claddings 14, 16, and 18. The core and the each of the various claddings can operate as wavelength subtraction filters for the wide angle polychromatic illuminating light 20 impinging on one end and fully filling the waveguide device 10.

The numerical aperture (NA) or light-gathering ability of a lightguide or optical fiber is dependent upon the refractive indices of the core and the cladding and determines the angles at which light rays will be propagated by the fiber. The greater the difference between the indices of the core and cladding, the larger the NA, the larger the acceptance cone of light and the larger the number of light modes will be conducted by the fiber. A low NA only conducts highly directional light.

The relation between NA, acceptance cone angle and indices are as follows:

$$NA = (n2 - n1)^{1/2}$$

where n2 is the refractive index of the core, and n1 is the refractive index of a cladding.

The half-angle (θ) of acceptance is related to the NA thus:

$$NA = \sin\theta$$

$$\theta = \arcsin(NA)$$

The NA of a optical fiber slightly decreases with fiber length as the high-order modes, i.e. those that travel near the critical angle are slowly lost.

Furthermore, light entering a waveguide can be classified as an incident ray, a reflected ray, or a refracted ray. Incident light is incoming light. Incident light that impinges on the waveguide at less than or equal to a critical angle, known as the angle of incidence, can propagate through the waveguide, while light at greater than the critical angle is reflected away from the waveguide. The light that enters the waveguide at less than or equal to the critical angle is transmitted through the waveguide so long as it remains at less than the critical angle (leaving aside scattering due to impurities and other imperfections). The critical angle (φ), measured from a vertical line normal to the materials interface (e.g. the interface, such as air, and the optic fiber, or between cladding layers or cladding and core layers in a fiber optic) can be expressed as a specific case of the Fresnel equations as:

$$\phi c = \arcsin(n_1/n_2),$$

where $n_1$ is the refractive index of the first material, and $n_2$ is the refractive index of the second material.

Refractive indexes measure the ratio of the velocity of light in a material to the velocity of light in a vacuum. Typical values for refractive indices are 1.0003 for air and 1.52 for a typical glass. In general any light transmitting material may be used as a waveguide in the present invention. More generally, at any angle, the relationship between incident and refracted rays is given by Snell's Law:

$$n_1 \sin\phi 1 = n_2 \sin\phi 2.$$

Note that conventionally angle φ is measured from a vertical line normal to a material interface whereas angle θ is measured for the horizontal center line, so φ+θ=90°.

Similarly and concomitantly, light leaving a waveguide material and entering another material (or entering atmosphere) would leave at angle as defined by Snell's law, and would be visible up to the critical angle θc as given above. In addition, the index of refraction between material interfaces is dependent on the wavelength being transmitted through the materials. Thus, different wavelengths will have different angles of acceptance at the interface between different materials. Thus visible light, composed of the spectrum from about 400–700 nm, would have a variety of critical angles at a given interface between two materials, depending on the wavelength transmitted by the waveguide.

Additional theory behind the physics of light propagation through materials can be found in any standard physics textbook, such as "Physics", by Halliday & Resnick, Part II, 3rd ed., (J. Wiley & Sons), incorporated herein.

Turning now to the preferred embodiment of FIG. 1, there is shown the core 12 is a polycarbonate of index 1.586 surrounded by a first cladding 14 of polymethyl methacrylate (PMMA) of index 1.492. A second cladding 16 of hexafluvopropylene vinylfluoride copolymer with index of 1.415 surrounds the first cladding. A third outer cladding 18 of a perfluorocarbon fluoroaliphatic copolymer of index 1.36 completes the waveguide. The light modes conducted by the core 12 and the first cladding 14 exit the fiber with an angle θ1 of 32 degrees based upon the above equations and indices. The higher light modes conducted by the core 12 (passing thought cladding 14) and the second cladding 16 exit the waveguide 10 with a maximum angle θ2 of 46 degrees. The highest light modes contained or reflected by the third cladding 18 exits the waveguide 10 at an angle of θ3 of 54 degrees. Thus it can be seen that the two surfaces exposed to atmosphere receive and conduct light through the waveguide 10 and transmit refracted rays of light about a certain predetermined solid angle or annulus at the ends that is determined by the indices of refraction of the materials with respect to atmosphere ($n_{air}$=1.0003). Light is further transmitted through waveguide 10 according to known theories for light propagation in an optic waveguide that has layers of materials of different refractive indices to form a composite waveguide.

In a preferred embodiment the core and cladding layers contain dye colorants that act as wavelength subtraction filters. These colorants can be obtained industrial pigment manufactures such as Reed Plastics, Holden, MA. and PDI (ICI), Edison, JN. In this manner different bands or cones of colored light are visible as a function of viewing angle (color shifts) with respect to the end of the waveguide device thereby providing an optical variable effect a user. This effect is illustrated by FIG. 2 where 10 is the waveguide fiber and 20 is the light source. More generally, a wavelength subtractive filter may be defined as either a layer or cladding that passes a certain wavelength in the visible range (color) either through interference with other layer materials or claddings or by containing colorants (pigments) in the layer or cladding.

Three cones of different color light beams become visible. The cone of light 21 of maximum angle θ1 of 32 degrees can for example be yellow with the use of a colorant of yellow hue within core 12, which acts by filtering out blue light and passing or transmitting yellow light. The cladding 14 can be either clear with no colorant, or could contain the same yellow colorant as the core 12, or be a different colorant. The cone of light 22 subtends between the angle θ1 of 32 degrees and a maximum angle θ2 of 46 degrees, and produces an orange cone of light. The angles of acceptance of 32 and 46 degrees depend on the materials used to form the layers 12, 14 and 16 in the composite waveguide, their index of refraction, as well as the wavelength transmitted through the waveguide and the composition of atmosphere, as is known per se in the theory of light transmission in a waveguide. Light cone 22 will appear orange due to an orange transmission colorant within second cladding 16. This orange colorant subtracts from the light rays reflecting from cladding 16 the green spectra from the yellow light. A red colorant within the third cladding 18 will result in the outermost cone of light 24, that is between 46 and 56 degrees of angle, to appear as a red color. It is to be noted that the light 21 that pass through the waveguide 10 only goes though the core 12 and is reflected by cladding 14, whereas light 22 passes through the yellow core 12, cladding 14 and is reflected by orange cladding 16. Likewise light 24 passes through the yellow core 12, cladding 14, orange cladding 16 and is reflected by the red cladding 18.

For illustrative purpose, in describing the present invention, it is assumed that the transmittance spectra shown in FIG. 3 apply. The light transmission characteristic of the clear polycarbonate core 12 is shown by spectral curve 26. The yellow colorant of core 12 has the spectra transmittance shown by curve 28. The orange colorant used in cladding 16 has the characteristics as depicted by spectral transmittance curve 30. The red colorant used in cladding 18 is depicted by transmittance curve 32.

Of course, this invention is not limited to the above preferred embodiment. For example, in another embodiment, different colors from the above description can be employed. A non-colored, clear core 12 and cladding 14 will simply transmit the visible spectrum of light 20 with the transmission characteristic of curve 26 so that light cone 20 will appear as white light. Cladding 16 with the spectral transmittance of curve 28 will result in a yellow light cone 22. Cladding 18 with a spectral transmittance of curve 34 will appear as a green light cone 24.

In still other embodiment, the core 12 can be clear, while cladding 14 has the transmittance of curve 35 of FIG. 3, providing a magenta color to light cone 21. Cladding 16 can have the transmittance of curve 32 providing a red color to lightcone 22. Cladding 18 can have the transmittance of curve 34 providing a visible green cone 24.

In further other embodiments it is possible to both decrease the number of cladding layers to a minimum of two, providing two colored cones of light, or increase the number of cladding layers as limited by the compatibility of the cladding chemistry and differences in cladding indices, which generally, for optimal transmission, are selected to decrease in index as radius or depth from the center core layer increases. In general, using the teachings herein, one skilled in the art may employ any number of waveguide subtractive filters to form a composite waveguide, that may have any plurality of materials superimposed on one another with different indices of refraction, to produce any desired light wavelength(s) at any desired angle(s) of refraction.

Further, a graded-index waveguide fiber in combination with a graded color filter (so color changes as function of fiber diameter) will provide a slow changing spectrum of colors as a function of viewing angle.

Visible, IR and UV colorants can be used in the waveguide device, and can also include fluorescent and phosphors dopants. The light emitted by these fluorescent and phosphors, when energized by their excitation light frequency, will also be selectively color guided by the subtractive color filters within the core and claddings. For example if UV excited blue and red fluorescence dopants were added to the core 12, and/or the first cladding layer 14 and the second cladding layer 16 contained a red subtractive colorant of filter characteristics of curve 32 of FIG. 3, then two cones of different color lights would be visible when a UV light penetrated the waveguide device 10. Light cone 21 would appear to be a magenta color while the light cone 22 would appear red.

In the previous examples the colorants were incorporated into the core or cladding layers themselves, however a second way of constructing this waveguide device is by providing separate color layers inside of each of the cladding layers. For example, cladding layer 16 in FIG. 1 could be simply a filter layer with a equal or even a larger index than cladding layer 14. This filter layer 16 would not act as a cladding only as a color layer. This color or filter layer (16) can be a color pigment or a thin film filter or multilayer interference coating made by solvent evaporation chemical deposition or vacuum sputtered.

The relative intensity of the light cones 21, 22 and 24 can be enhanced by controlling the angle intensity of the light sources 20. Illuminating the waveguide device 10 with light 20 at an oblique angle to the end of device 10 will increase the light intensity of the colored light cones 22 and 24 with respect to light cone 21.

The construction of the waveguide device is not limited to the polymers described above but can also be made of multi-cladding glass fibers or other combination of organic polymers. Plastic waveguides, being generally cheaper and more flexible, are the preferred medium. A general discussion of these polymers will help illustrate possible waveguide core-cladding combinations possible.

Typically organic polymers used for polymer core light guides are based upon the hydrocarbon chain and have refractive indices of 1.48 and greater. A list of these polymers as a function of index is shown in Table 1. Plastic optical fibers with cores of polymethyl methacrylate (PMMA) polystyrene (PS) and polycarbonate (PC) are commercially manufactured. Two classes of organic polymers suitable for use as cladding that provide low indices are the fluorocarbon and silicone polymers that substitute the fluorine atoms and siloxane chains respectively. Some of these polymers are also listed in Table 1 below.

TABLE 1

Refractive Index of optical polymers

| Polymer | Refractive Index |
| --- | --- |
| polystyrene (PS) | 1.60 |
| polycarbonate (PC) | 1.586 |
| polymethyl methacrylate (PMMA) | 1.492 |
| acrylic | 1.49 |
| polychlorotrifluoroethylene (PCTFE) | 1.425 |
| polyvinylidene fluoride (PVDF) | 1.42 |
| vinylidene fluoride-chlorotrifluoroethylene copolymer (VDF-CTFE) | 1.417 |
| hexafluoropropylene vinylfluoride copolymer | 1.415 |
| polydimethyl siloxane (PDMS)(silicone) | 1.40 |
| vinylidene fluoride-tetrafluoroethylene copolymer (VDF-TFE) | 1.40 |
| fluoroalkyl methacrylate N-aliphatic maleimide copolymer | 1.395 |
| vinylidene fluoride-hexafluoropropylene copolymer (VDF-HFP) | 1.39 |
| perfluorocarbon fluoroaliphatic copolymer | 1.36 |
| perfluorinated alkoxy copolymer (PFA)(teflon) | 1.35 |
| perfluorinated ethylene-propylene copolymer (FEP) | 1.34 |

Regarding the geometry of the device, although the waveguide fiber describe above had a round or cylindrical configuration, the device can also be made with a non-round configuration. A square, triangular, star or flat strip waveguide can be constructed and will have the same change in color with viewing angle. These non-round waveguide may have increased light loss, but these security waveguide devices are typically quite short so that their reduced efficiency cause by their non-round shape, their use of colorants and higher light loss optical materials is not a limiting restriction, as it is in optical fibers used in communications.

FIG. 4 shows an sheet or planar configuration of the present invention. This allows the waveguide device 36 to be made in a large sheet form and then cut into individual devices. Light source 38 edge illuminates the waveguide, or a side injection light source 40 at some arbitrary angle can be used. At the center of the sandwich device is the core 42. A cladding layers 44 and 46 sandwich the core on the bottom and top respectively. Second cladding layers 48 and 50 cover the layers 44 and 46. The core and cladding layers 44 and 46 provide color and guide the wedge (cone) of light 52. The lower plane 54 and upper plane 56 of this light beam are indicated. The claddings 48 and 50 color and guide the light beams 58 and 60 shown on either side of the beam 52. The outer most edges of these two light beams are indicated by reference nos. 62 and 64. in FIG. 4.

The planar waveguide device 36 is shown laminated to or inside a thin planar plastic credit card 66 in FIG. 5. A light source 68 illuminates the device 36 from any edge or top side of the card, here shown illuminating the short edge of the card. The planar waveguide device 36 is laminated to the lower body 70 and may contain a cover sheet 72 laminated to the top of the device 36. Shown in FIG. 5 are three colored light beams, 74, 76, and 78 that are emitted from the edge of the card 70 and correspond in principle to the light beams 52, 58 and 60 respectively of FIG. 4.

Incorporating the waveguide device into a gaming chip or token is shown in FIG. 6. The gaming chip 80 is shown having two optic fiber waveguide devices 82 and 84. Device 82 is a curved cylindrical waveguide embedded in the chip 80. A light source 86 illuminated one end of the device 82 at the edge of the chip. Three light beams 88, 90 and 92 are visible exiting the device at the chip's edge and correspond to the light beams 74, 76 and 78 of FIG. 4. Beam 88 corresponds to the cone of light 21 in FIG. 2, and beams 90 and 92 correspond to the cones of light 22, 24 of FIG. 2. A shorter waveguide device 84 is shown in FIG. 6 running between the top surface 94 and bottom surface 96 of chip 80. Light 98 injected into the waveguide device 84 will reappear as angled light beams 100, 102 and 104. Beam 100 corresponding to light cone 21 and light beams 102 and 104 correspond in principle to light cones 22, 24 of FIG. 2.

The waveguide device incorporated into the chip allows for direct viewing of the color shifts as the chip is tilted and thereby provides chip verification of authenticity, without the need for costly additional machinery.

Embedding the waveguide verification device 106 into currency paper 108 is shown in FIG. 7. The waveguide device 106 can be, for example, configured as a small round cylindrical fiber as in FIG. 2, or as a flat strip with a square or rectangle cross section. The thin round or strip shaped waveguide device 106 is shown with its length spanning the width of the currency paper or banknote 108, although the device could be located in any direction or location in the banknote. The device may or may not be embedded within the paper, and can be introduced between layers of the paper during its manufacture by a papermaking machine to embed the device within the paper. A light source 110 is shown, along with the angle dependent light 112 emitted by the end of the device 106, as taught by the present invention, and provides a verification of the authenticity of banknote 108.

Further, in all the embodiments of the present invention, though the light emitted from the waveguide verification device is in the visual range for optimal detection by a human operator, with no need for specialized machinery, in general a machine may be used to authenticate that the proper light is being emitted at a particular predetermined wavelength(s) and/or angles of refraction. In addition, wavelengths outside human vision can also be used such as infrared (IR) light.

It will be readily apparent to those skilled in this art that obvious modifications and changes can be made without departing from the spirit and scope of this invention.

What is claimed is:

1. A waveguide device for anticounterfeit security and authentication of an article comprising:

article for which authentication is useful, the article incorporating a waveguide;

said waveguide having surfaces through which light may be received, transmitted, reflected and refracted;

said waveguide comprised of a plurality of layers of light transmitting materials, each layer having different indices of refraction, with each layer transmitting light at different angles of refraction at said surfaces;

wherein said light transmitting materials are embedded in said article such that light can be transmitted through said waveguide wherein the waveguide is adapted to wavelength filter the received light and wherein ambient light, when received, transmitted, reflected and refracted by said waveguide, produces in said waveguide a color shift between different viewing angles of the waveguide.

2. The anticounterfeit device of claim 1, wherein:

said waveguide is an optical fiber, said plurality of layers of light transmitting materials comprise a series of concentric layers forming said optic fiber, said layers having a core layer and at least one cladding layer.

3. The anticounterfeit device of claim 2, wherein:

at least one of said plurality of layers acts as a color filter by passing light of a predetermined wavelength having a particular color, wherein said article, when viewed from a predetermined angle of refraction, displays light of said particular colored light.

4. The anticounterfeit device of claim 3, wherein said layer that acts as a color filter comprises a layer that contains a colorant.

5. The anticounterfeit device of claim 3, wherein:

said optical fiber has a graded index cladding with an index of refraction that decreases as the radius of the optical fiber increases.

6. The anticounterfeit device of claim 3, wherein:

said plurality of light transmitting layers have indices of refraction of between 1.3 and 1.6.

7. The anticounterfeit device of claim 3, wherein at least one of said light transmitting layers is doped with fluorescent and phosphors dopants, said dopants energized by predetermined excitation light frequencies to produce predetermined colors.

8. The anticounterfeit device of claim 2, wherein said optic fiber has a cross-section along its longitudinal length that is symmetrical and has a geometric shape selected from the group consisting of round, square, rectangular, triangular or star shaped cross-section geometries.

9. The anticounterfeit device of claim 1, wherein said waveguide is a planar optical sheet, and said plurality of layers of light transmitting materials comprise a series of coplanar sheet layers.

10. The anticounterfeit device of claim 9, wherein said article is a planar plastic card, and said planar optical sheet is laminated coplanar to said card.

11. The anticounterfeit device of claim 9, wherein at least one of said plurality of layers acts as a color filter by passing visible light of a predetermined wavelength having a particular color, wherein said article, when viewed from different angles, transmits the particular colored light from said surfaces at a predetermined angle of refraction.

12. The anticounterfeit device of claim 11, wherein said layer that acts as a color filter comprises a layer that contains a wavelength subtractive filter.

13. The anticounterfeit device of claim 9, wherein:

said plurality of layers of light transmitting materials are light transmitting optical polymers selected from the group consisting of:

polystyrene, polycarbonate, PMMA, acrylic, PCTFE, PVDF, VDF-CTFE, hexafluoropropylene vinylfluoride copolymer, polydimethyl siloxane, VDF-TFE, fluoroalkyl methacrylate N-aliphatic, maleimide copolymer, VDF-HFP, perfluorocarbon fluoroaliphatic copolymer, perfluorinated alkoxy copolymer, and FEP.

14. The anticounterfeit device of claim 9, wherein:

said plurality of light transmitting layers have indices of refraction of between 1.3 and 1.6.

15. The anticounterfeit device of claim 9, wherein at least one of said light transmitting layers is doped with fluorescent and phosphors dopants, said dopants energized by predetermined excitation light frequencies to produce predetermined colors.

16. A waveguide device for anticounterfeit security and authentication of an article comprising:

an article incorporating a waveguide;

said waveguide having surfaces through which light may be received, transmitted, reflected and refracted;

said waveguide comprised of a plurality of layers of light transmitting materials, each layer having different indices of refraction, with each layer transmitting light at different angles of refraction at said surfaces;

wherein said light transmitting materials are embedded in said article such that light can be transmitted through said waveguide;

said waveguide being an optical fiber, said plurality of layers of light transmitting materials comprising a series of concentric layers forming said optic fiber, said layers having a core layer and at least one cladding layer, wherein said article is a round coin-shaped casino chip and said optical fiber is embedded in said chip with said surfaces of said fiber extending to or near at least one surface of said chip.

17. A waveguide device for anticounterfeit security and authentication of an article comprising:

an article incorporating a waveguide;

said waveguide having surfaces through which light may be received, transmitted, reflected and refracted;

said waveguide comprised of a plurality of layers of light transmitting materials, each layer having different indices of refraction, with each layer transmitting light at different angles of refraction at said surfaces;

wherein said light transmitting materials are embedded in said article such that light can be transmitted through said waveguide;

said waveguide being an optical fiber, said plurality of layers of light transmitting materials comprising a series of concentric layers forming said optic fiber, said layers having a core layer and at least one cladding layer, wherein said article is paper and said optical fiber is embedded in said paper.

18. The anticounterfeit device of claim 3, wherein:

said plurality of layers of light transmitting materials are light transmitting optical polymers selected from the group consisting of:

polystyrene, polycarbonate, PMMA, acrylic, PCTFE, PVDF, VDF-CTFE, hexafluoropropylene vinylfluoride copolymer, polydimethyl siloxane, VDF-TFE, fluoroalkyl methacrylate N-aliphatic, maleimide copolymer, VDF-HFP, perfluorocarbon fluoroaliphatic copolymer, perfluorinated alkoxy copolymer, and FEP.

19. A waveguide comprising:

a waveguide comprised of a plurality of materials, each material having a unique predetermined refractive index, with said materials arranged adjacent to one another to form a composite layer waveguide capable of receiving, transmitting, reflecting and refracting light;

said waveguide exposed to ambient light from atmosphere, wherein the waveguide is adapted to wavelength filter the received light and wherein said ambient light, when received, transmitted, reflected and refracted by said waveguide, produces in said waveguide a color shift between different viewing angles of the waveguide.

20. The waveguide according to claim 19, wherein said waveguide is a waveguide selected from the group consisting of an optic fiber waveguide and a sheet waveguide.

21. The waveguide according to claim 20, wherein said materials in said waveguide composite layer have an index of refraction of between 1.3 and 1.6.

22. A composite waveguide for the authentication of an article comprising:

a first material having a first index of refraction;

a second material disposed adjacent to said first material having a second index of refraction;

said first and second materials forming a composite waveguide;

an article incorporating said waveguide;

wherein said first and second materials, when conducting light, refract light at predetermined angles of refraction to produce a color shift in the visible range, wherein said article is a casino chip, and said waveguide is an optic fiber embedded in said chip.

23. A composite waveguide for the authentication of an article comprising:

a first material having a first index of refraction;

a second material disposed adjacent to said first material having a second index of refraction;

said first and second materials forming a composite waveguide;

an article incorporating said waveguide;

wherein said first and second materials, when conducting light, refract light at predetermined angles of refraction to produce a color shift in the visible range, wherein said article is paper, and said waveguide is an optic fiber embedded in said paper.

24. A composite waveguide for the authentication of an article comprising:

a first material having a first index of refraction;

a second material disposed adjacent to said first material having a second index of refraction;

said first and second materials forming a composite waveguide;

an article for which authentication is useful, the article incorporating said waveguide;

wherein said first and second materials, when conducting light, refract light at predetermined angles of refraction to produce a color shift in the visible range, wherein said first and second materials are light transmitting optical polymers selected from the group consisting of: polystyrene, polycarbonate, PMMA, acrylic, PCTFE, PVDF, VDF-CTFE, hexafluoropropylene vinylfluoride copolymer, polydimethyl siloxane, VDF-TFE, fluoroalkyl methacrylate N-aliphatic, maleimide copolymer, VDF-HFP, perfluorocarbon fluoroaliphatic copolymer, perfluorinated alkoxy copolymer, and FEP.

25. A composite waveguide for the authentication of an article comprising:

a first material having a first index of refraction;

a second material disposed adjacent to said first material having a second index of refraction;

said first and second materials forming a composite waveguide;

an article for which authentication is useful, the article incorporating said waveguide;

wherein said first and second materials, when conducting light, refract light at predetermined angles of refraction to produce a color shift in the visible range, wherein at least one of said light transmitting materials is doped with fluorescent and phosphors dopants, said dopants energized by predetermined excitation light frequencies to produce predetermined colors in said visible range.

\* \* \* \* \*